US007910258B2

(12) United States Patent
Steinberg

(10) Patent No.: US 7,910,258 B2
(45) Date of Patent: Mar. 22, 2011

(54) NATURAL GAS DIRECT CARBON FUEL CELL

(75) Inventor: Meyer Steinberg, Meville, NY (US)

(73) Assignee: HCE, LLC, Oakton, VA (US)

( * ) Notice: Subject to any disclaimer, the term of this patent is extended or adjusted under 35 U.S.C. 154(b) by 12 days.

(21) Appl. No.: 12/099,981

(22) Filed: Apr. 9, 2008

(65) Prior Publication Data

US 2009/0258278 A1    Oct. 15, 2009

(51) Int. Cl.
*H01M 8/14*    (2006.01)
(52) U.S. Cl. ......... 429/472; 429/476; 429/512; 429/513
(58) Field of Classification Search .................. 429/16, 429/472, 476, 512, 513
See application file for complete search history.

(56) References Cited

U.S. PATENT DOCUMENTS

| | | | | |
|---|---|---|---|---|
| 4,902,586 A * | 2/1990 | Wertheim | ........................ | 429/20 |
| 6,815,105 B2 * | 11/2004 | Cooper et al. | .................. | 429/16 |
| 7,438,987 B2 * | 10/2008 | Cooper et al. | ................. | 429/523 |
| 2007/0026279 A1 * | 2/2007 | Hirsch et al. | ..................... | 429/22 |
| 2007/0269688 A1 * | 11/2007 | Lipilin et al. | ................... | 429/13 |

FOREIGN PATENT DOCUMENTS

CN    101051690 A   * 10/2007

* cited by examiner

*Primary Examiner* — Melvin C Mayes
*Assistant Examiner* — Melissa Stalder
(74) *Attorney, Agent, or Firm* — Louis Ventre, Jr.

(57) ABSTRACT

A natural gas fueled, direct carbon fuel cell produces electricity and hydrogen. It adds to an existing direct carbon fuel cell a carbon dioxide injection port to the cathode compartment; a natural gas feed port to the anode compartment, a hydrogen extraction port from the anode compartment, and a carbon dioxide extraction port from the anode compartment. To improve hydrogen generation efficiency, the anode compartment may have a louvered baffle dividing the anode compartment into an ante-chamber and a main chamber. The louvered baffle preferably has an upper section with slats angled from bottom to top and a lower section with slats angled from top to bottom. A heat exchanger is preferably included to pre-heat natural gas feed from hot hydrogen effluent. A second heat exchanger is preferably included to pre-heat oxygen-containing gas with hot nitrogen and carbon dioxide effluents.

4 Claims, 1 Drawing Sheet

NATURAL GAS DIRECT CARBON FUEL CELL

FIELD OF INVENTION

In the field of chemistry, a fuel cell using a molten electrolyte is capable of producing hydrogen and an electrical current directly from natural gas supplied to the cell from an external source.

BACKGROUND OF THE INVENTION

Over the past several years, the Direct Carbon Fuel Cell has been under development for converting carbon directly to electricity. The Direct Carbon Fuel Cell is an electrochemical fuel cell that may be fueled with carbon. The cell comprises ash-free, turbostratic carbon particles derived from any source, including from pyrolysis of natural gas. However, none has proposed a means for directly decomposing natural gas within a Direct Carbon Fuel Cell while extracting hydrogen gas from the cell and leaving the carbon particles within the cell.

No Direct Carbon Fuel Cell to date has been directly fueled with natural gas (methane) or gaseous and liquid carbonaceous fuels. The invention described herein uses methane or natural gas as fuel in a direct carbon fuel cell to produce coproducts hydrogen and electricity. Additionally, calculations indicate that hydrogen can be sold for less than $1.00 per gallon of gasoline equivalent of hydrogen, much less than the current market price of gasoline; and electricity can be produced for about 6.5 cents per kilowatt-hour.

This invention is especially amenable to producing and supplying hydrogen at vehicle gas filling stations. A natural gas fed direct carbon fuel cell is much more efficient and economical than conventional steam reforming of natural gas now being deployed for supplying hydrogen at gas filling stations. It also can do so with considerably reduced greenhouse gas carbon dioxide emission compared with the conventional steam reforming process.

Carbon dioxide is emitted at 100% concentration, so it can be easily collected and either sold or sequestered. Furthermore, the present invention simultaneously produces electricity and hydrogen. The electricity can be sold to power companies and put back into the grid, or can be dispensed at the gas station for electrically powered vehicles, which some think will eventually overtake hydrogen-fueled vehicles. In any case, this system could independently supply hydrogen fueled vehicles and electrically driven vehicles.

Another decided advantage of this invention is that hydrogen and electricity are coproduced in one unit. This simplifies operations and considerably reduces capital investment that would otherwise be required using the known method involving steam reforming of natural gas.

DESCRIPTION OF PRIOR ART

A practical application of the Direct Carbon Fuel Cell is described in U.S. Pat. No. 6,815,105. It consists of an electrochemical cell containing a molten electrolyte, usually alkali (Na, Li, K) carbonate at 600° C. to 1000° C., within an anode compartment and a cathode compartment. The compartments are separated by an ion permeable membrane (zirconia or other permeable high-temperature membrane).

In the cathode compartment, oxygen, typically from air reacts, with recycled carbon dioxide to produce carbonate ion ($CO_3^=$), which travels to the anode compartment through the permeable membrane. In the anode compartment, the carbonate ion reacts with the carbon fuel to produce carbon dioxide and releasing electrons which produces electricity for use in an external circuit. The reactions are as follows:

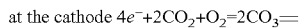

at the cathode $4e^- + 2CO_2 + O_2 = 2CO_3^=$

at the anode $C + 2CO_3^= = 3CO_2 + 4e^-$

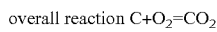

overall reaction $C + O_2 = CO_2$

The theoretical thermodynamic efficiency in the Direct Carbon Fuel Cell is 100% for conversion of the enthalpy ($\Delta H$) of oxidation of carbon to carbon dioxide to free energy ($\Delta F$) of reaction, which generates the electromagnetic electricity force, since the entropy change for the oxidation of carbon to carbon dioxide is zero, $\Delta H = \Delta F$.

The molten electrolyte fuel cell is well known for converting hydrogen to electricity. However, the theoretical thermodynamic efficiency of hydrogen as fuel is only 70%. Thus, the molten carbonate fuel cell with carbon fuel is inherently more efficient than the molten carbonate fuel cell with hydrogen fuel. In the laboratory, thermal efficiencies for the Direct Carbon Fuel Cell with carbon fuel have been obtained reaching 90%. For a practical current density fuel cell for electrical power production, the Direct Carbon Fuel Cell is projected to be 80% thermally efficient. If one combines hydrogen and carbon in a Direct Carbon Fuel Cell, both the hydrogen and the carbon are typically converted to electricity within the cell, albeit at different efficiencies.

It is also known that natural gas (methane) can be cracked and decomposed to carbon and hydrogen at temperatures above about 500° C. Much work has been performed on cracking methane to carbon and hydrogen in various reactors, such as a furnace heated by gas or by electricity, a high temperature plasma or in a bath of molten metal (tin) or in molten salt (sulfate or carbonate). The reaction is endothermic requiring 18 kcal/g-mol of methane to drive the reaction decomposition and is as follows: $CH_4 = C + 2H_2$. However, this invention is the first to propose a means to combine the natural gas cracking process within a Direct Carbon Fuel Cell to produce both electricity and hydrogen.

BRIEF SUMMARY OF THE INVENTION

A natural gas fueled, direct carbon fuel cell produces electricity and hydrogen. It includes a cathode compartment comprising an oxygen-containing gas, a carbon dioxide feeding port and a molten electrolyte; an anode compartment comprising a port for feeding natural gas to the anode compartment, a hydrogen extraction port, a carbon dioxide extraction port, and a slurry comprising said molten electrolyte; and, an electron insulating, ion conducting, porous ceramic separator between the cathode compartment and the anode compartment. To improve hydrogen generation efficiency, the anode compartment may have a louvered baffle dividing the anode compartment into an ante-chamber adjacent to the port for feeding natural gas and a main chamber adjacent to the separator between the cathode compartment and the anode compartment. The louvered baffle preferably has an upper section with slats angled from bottom to top and a lower section with slats angled from top to bottom when viewed from a side wherein the port for feeding natural gas is on the left. Preferably included is a heat exchanger operably connected to transfer heat from hydrogen effluent out of the anode compartment to natural gas. It may also have a heat exchanger operably connected to transfer heat from nitrogen and carbon dioxide effluents out of the cathode compartment to the oxygen-containing gas.

DETAILED DESCRIPTION

Figure 1:
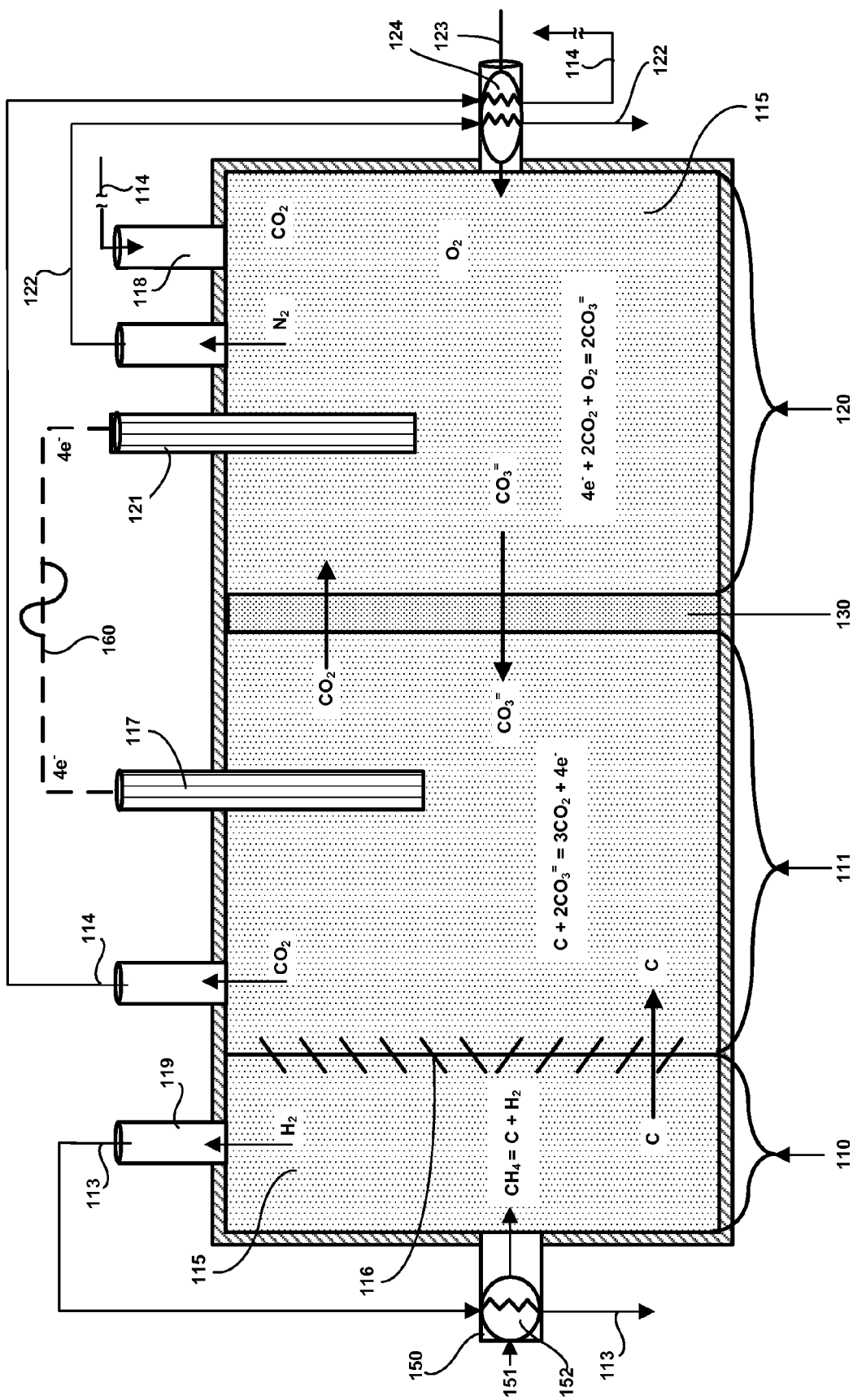
FIG. 1 is a diagram showing a sectional side view of a Natural Gas Direct Carbon Fuel Cell according a preferred embodiment of the invention.

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural and operational changes may be made without departing from the scope of the present invention.

FIG. 1 is a diagram showing a sectional side view of a direct carbon fuel cell modified according to a preferred embodiment the invention. This invention uses natural gas (151), also known as methane. Natural gas and methane are used interchangeably herein. Natural gas (151) is a feed stock to produce coproducts hydrogen gas (113) and electricity (160) by combining molten-salt methane decomposition with the Direct Carbon Fuel Cell (DCFC) in one unit, known as Natural Gas Direct Carbon Fuel Cell (NGDCFC).

The anode compartment of the Natural Gas Direct Carbon Fuel Cell acts as the methane decomposer to form particulate solid carbon, which remains in the molten salt, and hydrogen gas (113) is evolved from the reaction and exhausted from the cell at the hydrogen ejection port (119).

Natural gas (151) is introduced through a methane feed port (150). The carbon in the molten salt electrolyte (115) combines with a carbonate ion ($CO_3$—) and produces electricity (160) for the power circuit between the anodic electrode (117) and the cathodic electrode (121) and carbon dioxide (114) evolves from the anode compartment of the cell as a gas in a concentrated stream.

To prevent gaseous hydrogen (113) from reacting with the highly-concentrated gaseous carbon dioxide (114) to produce water and carbon monoxide in the anode compartment, the gases are quickly quenched or cooled after they are emitted from the anode compartment.

An alternative embodiment divides the anode compartment into two sections: an ante-chamber (110) methane decomposer section and a main anode section (111). The two sections are created by the addition of a louvered baffle (116) in the anode compartment. For simplicity of discussion, the invention will be hereinafter discussed assuming the anode compartment is divided into these two sections. For the embodiment that does not have a divided anode compartment, the references to the main anode section (111) may be interpreted to be references to the anode compartment when the context so permits.

The louvered baffle (116) provides added efficiency because it creates a separate ante-chamber (110) for methane decomposition to take place within the anode compartment allowing removal of hydrogen (113) separately from the molten salt electrolyte (115) and minimizing possible reaction with carbon dioxide (114) evolving in the anode compartment.

Solid particulate carbon produced in the ante-chamber (110) methane decomposer section is retained in the molten carbonate salt electrolyte. The carbon flows through the louvered baffle to the main anode section (111) where the anodic electrode (117) is situated, allowing the carbon to react with the carbonate ion to form carbon dioxide (114). In this manner, the hydrogen evolves separately in the ante-chamber (110) methane decomposer section and the carbon dioxide (114) evolves separately in the main anode section. The natural gas (151) feed and the hydrogen gas (113) released in the ante-chamber (110) methane decomposer section provide enough convection and turbulence for mixing the molten carbonate salt electrolyte to flow the carbon through the louvers to the main anode section (111). The positioning of the slats in the louvered baffle (116), top in one direction and the bottom in the opposite direction, promotes circulation of the molten salt between the two anode sections. Preferably, an upper section of the louvered baffle (116) has slats angled from bottom to top and a lower section if the louvered baffle (116) has slats angled from top to bottom when viewed from a side wherein the port for feeding natural gas is on the left.

Carbon dioxide (114) is recycled from the main anode section to the cathode compartment (120) by both back diffusion through a membrane (130) and by recycle of carbon dioxide (114) gas from the main anode section (111) to the carbon dioxide injection port (118). Upon injection into the cathode compartment (120) or upon back diffusion through the membrane, the carbon dioxide forms the carbonate ion with oxygen from the oxygen-containing gas (123), typically air.

The thermal energy to decompose the natural gas (151) to carbon and hydrogen in the ante-chamber (110) methane decomposer section is obtained from the 20% inefficiency of the direct carbon fuel cell carbon-oxidation reaction. Thus, the direct carbon fuel cell operates autothermally, requiring no additional energy input. Preheating the natural gas (151) feed is accomplished by a feed heat exchanger (152) transferring the heat from the hot hydrogen (113) effluent from the ante chamber (110) to the natural gas (151) feed input to the direct carbon fuel cell. A second heat exchanger (124) transferring heat for the hot carbon dioxide (114) effluent from the anode compartment and hot nitrogen (122) effluent from the cathode compartment preheats incoming oxygen-containing gas (123), typically air.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

What is claimed is:

1. A natural gas fueled, direct carbon fuel cell for producing electricity and hydrogen comprising:
    a cathode compartment comprising: an oxygen-containing gas; a carbon dioxide feeding port; and a molten electrolyte;
    an anode compartment comprising: a port for feeding natural gas to the anode compartment; a hydrogen extraction port; a carbon dioxide extraction port; and a slurry comprising said molten electrolyte;
    wherein the anode compartment further comprises:
        a louvered baffle dividing the anode compartment into an ante-chamber adjacent to the port for feeding natural gas, wherein the ante-chamber comprises the hydrogen extraction port; and
        a main chamber adjacent to the separator between the cathode compartment and the anode compartment; and
    an electron insulating, ion conducting, porous ceramic separator between said cathode compartment and said anode compartment.

2. The natural gas fueled, direct carbon fuel cell of claim 1 wherein the louvered baffle comprises an upper section with slats angled from bottom to top and a lower section with slats angled from top to bottom when viewed from a side wherein the port for feeding natural gas is on the left.

3. The natural gas fueled, direct carbon fuel cell of claim 1 further comprising a heat exchanger operably connected to transfer heat from hydrogen effluent out of the anode compartment to natural gas.

4. The natural gas fueled, direct carbon fuel cell of claim 1 further comprising a heat exchanger operably connected to transfer heat from nitrogen and carbon dioxide effluents out of the cathode compartment to the oxygen-containing gas.

* * * * *